United States Patent
Kim et al.

(10) Patent No.: US 12,372,605 B2
(45) Date of Patent: Jul. 29, 2025

(54) UNMANNED AERIAL VEHICLE DETECTION METHOD AND APPARATUS WITH RADIO WAVE MEASUREMENT

(71) Applicant: HURA CO., LTD., Daejeon (KR)

(72) Inventors: Sang Tae Kim, Sejong-si (KR); Seong Yun Lee, Sejong-si (KR); Mi Kyung Suk, Sejong-si (KR)

(73) Assignee: HURA CO., LTD., Daejeon (KR)

( * ) Notice: Subject to any disclaimer, the term of this patent is extended or adjusted under 35 U.S.C. 154(b) by 465 days.

(21) Appl. No.: 17/887,584

(22) Filed: Aug. 15, 2022

(65) Prior Publication Data

US 2023/0108038 A1   Apr. 6, 2023

(30) Foreign Application Priority Data

Oct. 6, 2021 (KR) .................. 10-2021-0132101
Jun. 22, 2022 (KR) .................. 10-2022-0076281

(51) Int. Cl.
*G01S 5/02* (2010.01)
*G01S 3/46* (2006.01)

(52) U.S. Cl.
CPC .............. *G01S 5/0278* (2013.01); *G01S 3/46* (2013.01)

(58) Field of Classification Search
CPC ... G01S 13/88; G01S 7/41; G01S 3/46; G01S 5/0278; G08G 5/0069; G08G 5/0026; G08G 5/0013; G08G 5/0082; G08G 5/0056; G08G 5/0052; G08G 5/006; H04B 7/18506; H04B 17/382; H04W 24/08; G06V 10/00–993
See application file for complete search history.

(56) References Cited

U.S. PATENT DOCUMENTS

| | | | |
|---|---|---|---|
| 3,085,242 A * | 4/1963 | Werner | G01S 13/72 342/139 |
| 9,812,020 B2 * | 11/2017 | Lee | G08G 5/0069 |
| 11,055,566 B1 * | 7/2021 | Pham | G06V 10/82 |
| 2019/0180630 A1 * | 6/2019 | Kleinbeck | G01S 3/46 |
| 2022/0036741 A1 * | 2/2022 | Ozturk | G08G 5/0069 |

FOREIGN PATENT DOCUMENTS

| KR | 10-2331371 B1 | 12/2021 |
|---|---|---|
| KR | 10-2335765 B1 | 12/2021 |

* cited by examiner

*Primary Examiner* — Cassi J Galt
(74) *Attorney, Agent, or Firm* — NSIP Law

(57) ABSTRACT

The detection and identification of unmanned aerial vehicles (UAVs) from a radio wave measurement result based on artificial intelligence (AI) are provided. A method of operating an apparatus to detect unmanned aerial vehicles (UAVs) includes generating a spectrogram, determining a first region to find a direction of the UAVs in the spectrogram, determining a direction of a first UAV of the UAVs based on signal values in the first region, determining a second region to identify a type of the first UAV in the spectrogram, and identifying the type of the first UAV based on signal values in the second region.

17 Claims, 17 Drawing Sheets

UNMANNED AERIAL VEHICLE DETECTION METHOD AND APPARATUS WITH RADIO WAVE MEASUREMENT

CROSS REFERENCE TO RELATED APPLICATIONS

This application claims the benefit under 35 USC § 119(a) of Korean patent application 10-2021-0132101 filed on Oct. 6, 2021, and Korean patent application 10-2022-0076281 filed on Jun. 22, 2022, the entire disclosures of which are incorporated herein by reference for all purposes.

BACKGROUND

1. Field

The following description relates to an unmanned aerial vehicle detection method and apparatus with radio wave measurement.

2. Description of Related Art

An unmanned aerial vehicle refers to an aircraft that is operated based on remote control without a pilot being present in the aircraft. Unmanned aerial vehicles are often called drones, and are also new growth engines that have been attracting attention in recent years. The application and use of unmanned aerial vehicles are rapidly increasing worldwide. As a social issue accompanying this, problems such as crime, terrorism, and invasion of privacy caused by individuals using unmanned aerial vehicles are also occurring.

Anti-drone technology is being studied to solve various problems caused by unmanned aerial vehicles, and the market in the anti-drone field is gradually expanding along with the growth of the drone industry. Specifically, securing an anti-drone solution to protect major national facilities such as airports, ports, and power plants is becoming very important nationally. Anti-drone technology is largely divided into detection technology and neutralization technology. In an example, the detection technology may be implemented based on technologies such as, but not limited to, radar, radio signal detection, electro-optical/infra-red (EO/IR), and acoustic detection.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a method performed by an apparatus that detects unmanned aerial vehicles (UAVs) includes generating a spectrogram; determining a first region to find a direction of the UAVs in the spectrogram; finding a direction of a first UAV of the UAVs based on signal values in the determined first region; determining a second region to identify a type of the first UAV in the spectrogram; and identifying the type of the first UAV based on signal values in the determined second region.

The identifying the type of the first UAV may include determining a receive beamforming weight of signals from the first UAV based on the detected direction of the first UAV; performing receive beamforming on the signals from the first UAV based on the receive beamforming weight; and determining the type of the first UAV from the receive-beamformed signals by implementing an artificial intelligence model.

The identifying the type of the first UAV may include determining whether to perform the receive beamforming based on signal quality of the signals from the first UAV.

The method may include selecting the artificial intelligence model from among a plurality of artificial intelligence models based on characteristic information of the signals from the first UAV, wherein the characteristic information comprises at least one of a frequency, a bandwidth, a signal duration, and a signal quality of the signals.

The detecting of the direction of the first UAV may include dividing the spectrogram into a plurality of grid blocks; receiving a plurality of direction-finding results by applying a direction-finding algorithm to each of the plurality of grid blocks; and grouping the plurality of direction-finding results into at least one group based on at least one of directions indicated by the direction finding results and positions of the grid blocks, wherein the at least one group comprises at least one of a first group including signals from the first UAV and a second group including signals from a second UAV of the UAVs.

The first region may be determined such that the first region includes a band of signals from the first UAV on a frequency axis, and the first region comprises a start part of signals from the first UAV on a time axis, and a ratio of a period in which the signals are present is closest to a designated ratio.

The type of the first UAV may be identified by implementing an artificial intelligence model, and wherein the artificial intelligence model may be trained based on learning data that is generated, such that the learning data comprises a band of signals from a UAV on a frequency axis, the learning data comprises a start part of signals from the UAV on a time axis, and a ratio of a period in which the signals are present is closest to a designated ratio.

The first region may be selected based on respective representative values of a plurality of grid blocks divided from the spectrogram, or the first region is selected based on a pattern of values of pixels included in an image expressing the spectrogram.

In a general aspect, a method performed by a first apparatus that detects an unmanned aerial vehicle (UAV) includes generating a spectrogram; determining a region to identify a type of the UAV from the spectrogram; and identifying the type of the UAV based on signal values in the determined region.

The spectrogram may be generated from received signals or may be received from a second apparatus.

The region may be determined such that the region comprises a band of signals from the UAV on a frequency axis, and the region may include a start part of signals from the UAV on a time axis, and a ratio of a period in which the signals are present is closest to a designated ratio.

In a general aspect, a method of operating an apparatus that detects an unmanned aerial vehicle (UAV) includes generating an image indicating a real-time spectrogram; determining at least one region of the spectrogram based on a pattern of values of pixels included in the generated image; and finding a direction of the UAV based on received signals corresponding to the at least one region.

The method may include classifying the at least one region into a plurality of groups; and identifying a group corresponding to a signal related to the UAV based on at least one of a size and a frequency-axis position of at least one signal region of each of the plurality of groups.

The determining of the direction of the UAV may include reading information on received signals corresponding to the at least one region; and determining the direction of the UAV based on an analysis of the received signals.

The determining of the at least one region may include generating a secondary image by performing a preprocessing operation on the image; generating a tertiary image by binarizing each of pixel values of the secondary image; and determining the at least one region based on at least one cluster of pixels having a positive value among pixels having binarized values included in the tertiary image.

The preprocessing operation may include at least one of a noise reduction operation of the image and a boundary value suppression operation of pixel values included in the image.

The boundary value suppression operation may include an operation of changing values less than a threshold value among the pixel values to minimum values, or an operation of adjusting values adjacent to the threshold value upward or downward.

The determining of the direction of the UAV may include determining phase difference values between received signals in antenna elements of an array antenna; determining an incidence value of the received signals based on the phase difference values; and determining the direction based on the incidence angle.

The method may include estimating a distance from the UAV.

The distance may be estimated based on at least one of sound collected in the direction, and an image captured in the direction.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
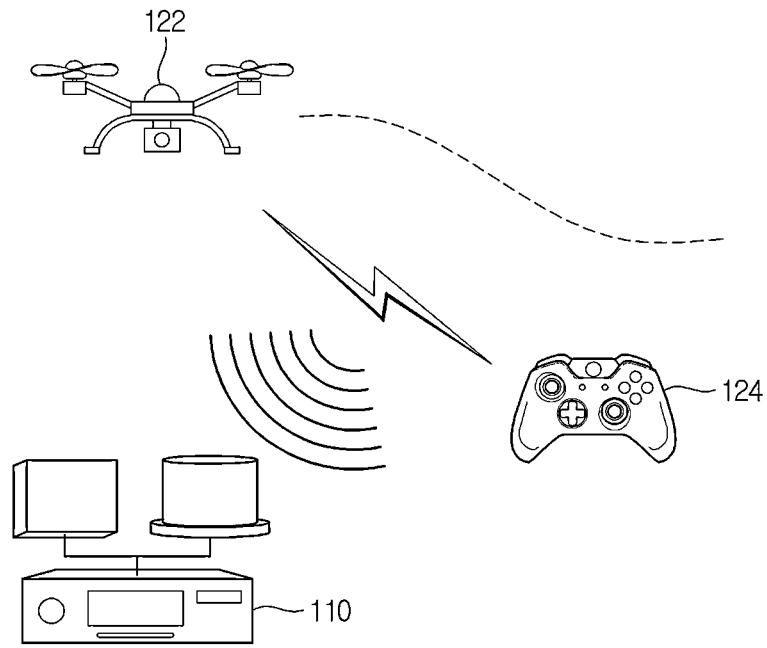
FIG. 1 illustrates an example detection of an unmanned aerial vehicle (UAV), in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, the suffixes "module" and "unit" of elements herein are used for convenience of description and thus can be used interchangeably and do not have any distinguishable meanings or functions.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples relate to the detection and identification of an unmanned aerial vehicle (UAV) and, more specifically, to a method and apparatus that detects an unmanned aerial vehicle by using a radio wave measurement result and identifying the unmanned aerial vehicle based on artificial intelligence (AI).

One or more examples provide a method and apparatus for effectively detecting and identifying an unmanned aerial vehicle (UAV).

One or more examples provide a method and apparatus for detecting and identifying an unmanned aerial vehicle using a signal generated by the unmanned aerial vehicle.

One or more examples provide a method and apparatus for detecting and identifying an unmanned aerial vehicle based on artificial intelligence (AI).

One or more examples provide a method and apparatus for finding presence and direction of an unmanned aerial vehicle based on a real-time spectrogram for a given band.

One or more examples provide a method and apparatus for identifying a type of an unmanned aerial vehicle based on a real-time spectrogram for a given band.

One or more examples may more effectively detect and identify an unmanned aerial vehicle (UAV).

Hereinafter, the one or more examples propose technology to detect and identify an unmanned aerial vehicle (UAV) based on radio wave measurement. Specifically, one or more examples relate to technology to detect the appearance and direction of an unmanned aerial vehicle by implementing a signal transmitted and received between the unmanned aerial vehicle and a controller of the unmanned aerial vehicle, and identifying the type of the unmanned aerial vehicle. Specifically, one or more examples relate to technology to detect a drone signal band based on image processing, technology to extract a signal region for direction finding in the detected band, direction finding technology for a signal with a short signal period, an enhancement technology of a signal for improvement of an identification ratio, unmanned aerial vehicle type identification technology implementing artificial intelligence (AI), and the like. In the following description, the unmanned aerial vehicle may be referred to as a 'drone' or other terms having an equivalent technical meaning.

The frequency bands implemented by drones are mainly unlicensed bands. In other words, drones mainly use the industry-science-medical (ISM) bands: 400 MHz band, 900 MHz band, 2.4 GHz band, and 5.8 GHz band. In the example of an industrial drone, control and/or communication of the drone is sometimes performed using mobile communication. Since several communication devices implement the unlicensed band together, various signals may be mixed in the unlicensed band. For example, various services such as wireless fidelity (Wi-Fi), Bluetooth, remote control, amateur radio, long term evolution (LTE), and 5th generation (5G) are used together in a frequency at which a drone is operated. According to these band characteristics, the drone control/image signal may have a short duration and may use a method of changing and using the frequency. For example, in order for multiple users to share the frequency, technologies such as carrier sense multiple access (CSMA), frequency hopping, orthogonal frequency division multiple access (OFDMA) may be applied. Accordingly, the signal duration may be shortened. In this example, the creation of the control/image signal of the drone is a technology that determines the performance of the drone, and it is common to use a different protocol for each manufacturer.

As a radio wave detection technology that is one of multiple anti-drone technologies, the radio wave measurement-based technology uses a method of detecting a drone by detecting a drone control and/or response signal and image signal, which are signals between the drone and an operator, and estimating the directions and positions of the drone and the operator. For direction finding of a drone signal, a wide broadband spectrum is obtained to detect a changed frequency, only a region determined to be a drone signal is selected from the broadband spectrum, and then direction finding is performed using the selected region, thereby greatly improving the search speed of a drone scanner and search of the drone signal. The drone detection technology based on the above-described radio wave measurement is illustrated in FIG. 1 below.

FIG. 1 illustrates an example of detection of an unmanned aerial vehicle (UAV), in accordance with one or more embodiments.

Referring to FIG. 1, a drone 122 may fly, or be operated, according to a control signal transmitted by a controller 124. Additionally, the drone 122 may transmit a signal including an image captured by a camera to the controller 124. In this example, a detection apparatus 110 may detect the drone 122 based on a signal (e.g., a control signal, an image signal, etc.) transmitted and received between the drone 122 and the controller 124. In an example, the detection apparatus 110 includes an antenna that receives a signal, and the antenna may include one of a circular array antenna, a planar array antenna, and a linear array antenna, as non-limiting examples.

As shown in FIG. 1, the drone detection technology based on radio wave measurement consists of an element technology to detect a signal and an element technology to estimate at least one of a presence, a direction, and a position of a drone based on the detected signal. The method of estimating the direction and/or position of a drone using radio signals including drone control and image information has the advantage of almost no performance degradation when it is difficult to secure visibility due to dark night, fog, or rain, as may occur among various drone detection technologies.

When the drone is operated in an unlicensed band, various communication devices coexist, and thus various signals may be mixed. According to these band characteristics, the control and/or image signal for the drone may have a short duration, and may be transmitted while changing the frequency. Specifically, since the design of the control and/or image signal of the drone is a factor that determines the performance of the drone, different protocols may be applied for each manufacturer. Therefore, in order to detect a drone signal, it is beneficial to acquire a wide broadband spectrum so as to detect a changed frequency, and to selectively use only a region determined to be a drone signal in the broadband spectrum. Through this, it is expected that the search and detection speed of the drone signal will be improved.

Accordingly, the example apparatus may select a band of a signal using a real-time spectrogram, and extract a signal for direction finding from the selected band. Specifically, the proposed technology is technology that performs direction finding by implementing a signal having a short period, and the example apparatus may perform operations such as, but not limited to, generating a real-time spectrogram, selecting a signal region, and direction finding.

The example technology may include the detection of an unmanned aerial vehicle, and the identification of the unmanned aerial vehicle. Identification of the unmanned aerial vehicle refers to an operation that identifies the type (e.g., manufacturer, model name, communication protocol, etc.) of the detected unmanned aerial vehicle. Detection of the unmanned aerial vehicle may include a signal detection operation that identifies the presence of the unmanned aerial vehicle, and a direction-finding operation that identifies the direction of the unmanned aerial vehicle.

Figure 2:
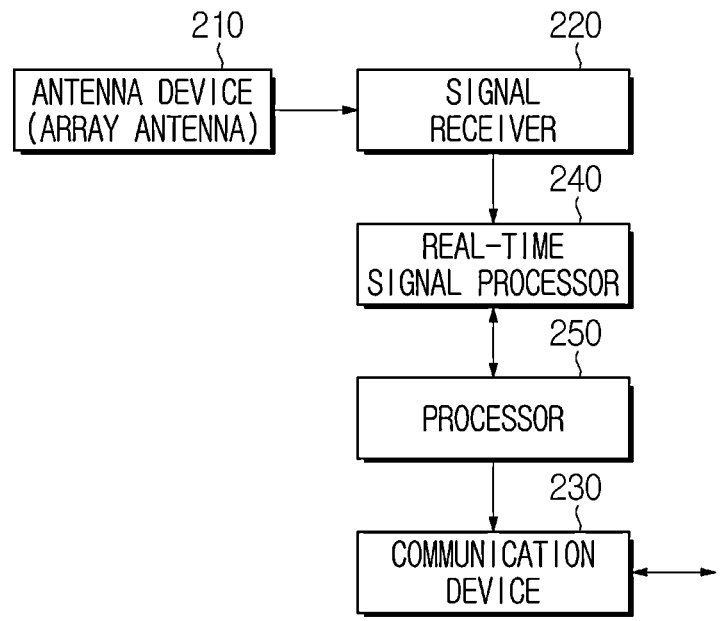
FIG. 2 illustrates an example apparatus that detects and identifies an unmanned aerial vehicle, in accordance with one or more embodiments.

FIG. 2 illustrates a configuration of an example apparatus that detects and identifies an unmanned aerial vehicle, in accordance with one or more embodiments. FIG. 2 may be understood as a structure of the example detection apparatus 110 of FIG. 1.

Referring to FIG. 2, the apparatus includes an antenna device 210, a signal receiver 220, a communication device 230, a real-time signal processor 240, and a processor 250.

The antenna device 210 includes at least one antenna. In an example, the antenna device may be an array antenna including a plurality of antenna elements. In an example, the antenna device 210 may include an array antenna having a one-dimensional or multi-dimensional structure.

The signal receiver 220 processes an RF signal. The signal receiver 220 may process the received signal in a form that may be processed by the real-time signal processor. In an example, the signal may be provided from a separate receiving device or may be received through an antenna or array antenna 210 physically connected to the signal receiver 220.

The communication device 230 allows the apparatus to transmit and receive signals to/from another apparatus. The communication device 230 provides a wired or wireless interface, and may transmit and receive data according to a corresponding communication protocol. For example, the communication device 230 may transmit or receive a signal to set and control the apparatus, a signal indicating a result of detection of an unmanned aerial vehicle, and the like. The communication device 230 may be referred to as a 'transmitter', 'receiver' or 'transceiver'.

The real-time signal processor 240 may generate a real-time spectrogram by processing a digital signal transmitted from the signal receiver 220 in real time. In order to process signals in real time, the processing operation may be performed quickly to accurately process all signal elements within a frequency band of interest. Specifically, the real-time signal processor 240 may continuously and rapidly perform all operations so that the output of analysis may follow a change in an input signal. Accordingly, a fast Fourier transform (FFT) operation may be performed on a corresponding unit signal for a time shorter than a length (e.g., acquisition time) of one unit signal (e.g., frame) extracted from the time axis. In addition, the real-time signal processor 240 may perform a receive beamforming operation to increase the gain of a received signal. That is, the real-time signal processor 240 may perform receive beamforming by multiplying signals received through a plurality of antenna elements by beamforming weights and then summing the received signals multiplied by the weights. Accordingly, the real-time signal processor 240 may include at least one of a field programmable gate array (FPGA), an application specific integrated circuit (ASIC), a graphics processing unit (GPU), a digital signal processor (DSP), or a high-performance processor.

The processor 250 may control the overall functions of the apparatus. The processor 250 may analyze radio wave data provided from the signal receiver 220 and the real-time signal processor 240. The processor 250 may transmit and/or receive data to/from another apparatus through the communication device 230. Additionally, the processor 250 may detect an unmanned aerial vehicle based on the real-time spectrogram. Additionally, the processor 250 may identify the type of the unmanned aerial vehicle based on the real-time spectrogram. That is, the processor 250 may control the apparatus to detect the unmanned aerial vehicle according to various embodiments to be described later. The real-time signal processor 240 and the processor 250 are components having the ability to perform an operation, and may perform some functions interchangeably. That is, at least a part described as an operation of the real-time signal processor 240 may be performed by the processor 250, or at least a part described as an operation of the processor 250 may be performed by the real-time signal processor 240. Accordingly, the real-time signal processor 240 may also be understood as a type of processor, and in this example, the real-time signal processor 240 and the processor 250 may be implemented as at least one processor.

By operation of the apparatus configured as shown in FIG. 2, an unmanned aerial vehicle may be detected according to various embodiments. Although FIG. 2 illustrates the structure of a single apparatus, this is only an example. An unmanned aerial vehicle may be detected and identified by the collaboration of two or more apparatuses, in accordance with one or more examples.

In an example, one of the two or more apparatuses may perform an operation of analyzing a radio signal, and the other apparatus may detect the presence and the direction/position of the unmanned aerial vehicle based on the analysis result of the radio signal, and identify the type of the unmanned aerial vehicle. As another example, an operation of collecting radio signals may be performed by a separate apparatus. As another example, the operation of identifying the type of the unmanned aerial vehicle may be performed by a separate apparatus. In this example, the apparatus of FIG. 2 may perform a detection operation and then provide data for the identification operation to another apparatus, and the other apparatus may perform an identification operation and provide information indicating the identification result to the apparatus of FIG. 2. Hereinafter, procedures according to various embodiments are described as being performed by one apparatus, but may be understood to be performed by a plurality of apparatuses.

Figure 3:
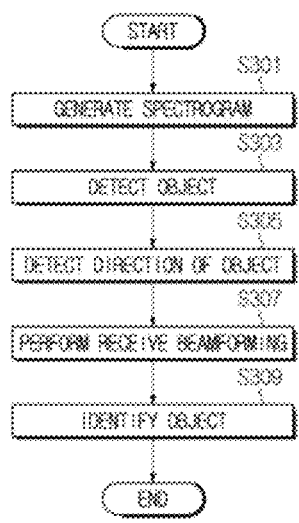
FIG. 3 illustrates an example procedure that detects and identifies an unmanned aerial vehicle, in accordance with one or more embodiments.

FIG. 3 illustrates an example procedure to detect and identify an unmanned aerial vehicle, in accordance with one or more embodiments. FIG. 3 illustrates an operation method of the apparatus (e.g., the detection apparatus 110 of FIG. 1). The operations in FIG. 3 may be performed in the sequence and manner as shown. However, the order of some operations may be changed, or some of the operations may be omitted, without departing from the spirit and scope of the shown example. Additionally, operations illustrated in FIG. 3 may be performed in parallel or simultaneously. One or more blocks of FIG. 3, and combinations of the blocks, can be implemented by special purpose hardware-based computer that perform the specified functions, or combinations of special purpose hardware and instructions, e.g., computer or processor instructions. In addition to the description of FIG. 3 below, the descriptions of FIGS. 1-2 are also applicable to FIG. 3 and are incorporated herein by reference. Thus, the above description may not be repeated here for brevity purposes. The operations of FIG. 3 may be performed by a processor.

Referring to FIG. 3, in operation S301, the apparatus generates a spectrogram. In an example, the apparatus may generate a plurality of spectrograms by implementing synchronized multi-channel receivers. In this example, the apparatus may generate synchronized complex spectrograms. Specifically, the apparatus generates a complex spectrogram for each synchronized reception channel from synchronized IQ data received through an array antenna. In an example, synchronization between spectrograms may be beneficial for effective direction finding. Due to synchronization, phase difference value information between signals of the same time and frequency may be obtained. In an example, the spectrogram may be a real-time spectrogram or a non-real-time spectrogram. In this example, the real-time spectrogram may provide better results than the non-real-time spectrogram.

In operation S303, the apparatus detects an object. That is, the apparatus determines whether at least one object that has transmitted a signal is present based on the spectrogram. In other words, the apparatus performs signal detection. Specifically, the apparatus may perform signal detection by determining whether a signal having a predetermined magnitude or energy is present in the spectrogram. The operation of determining the presence of the object may be included in the operation of extracting a signal region to find the direction of the object.

In operation S305, the apparatus finds the direction of the object. The apparatus may find a direction of a signal source object based on a phase difference between signals received through the plurality of antennas, and the direction of the signal source may be treated as the direction of the object. Specifically, the apparatus may find the direction by using a signal within a region identified through signal detection in operation S303.

In operation S307, the apparatus performs receive beamforming. Through receive beamforming, reception gain of the signal may be increased. This results in widening an object identification distance, that is, object identification coverage. Receive beamforming may be performed on a buffered signal after being previously used for direction finding, or may be performed on a newly received signal after finding the direction.

In operation S309, the apparatus may identify the object. In other words, the apparatus may identify the type of the object. In an example, the type includes at least one of whether the apparatus is a drone, a manufacturer of the apparatus, a model name of the apparatus or a communication protocol used by the drone. The type of the object may be identified based on a pattern of a signal transmitted from the object. In an example, the type of the object may be identified using an artificial intelligence model.

According to the procedure described with reference to FIG. 3, the object may be detected and identified. In the above-described embodiment, the apparatus performs receive beamforming. However, in one or more examples, receive beamforming may be adaptively performed. Receive beamforming may not always be performed, and may be performed when a set condition is satisfied. In this example, the apparatus may determine whether the condition is satisfied, and identify the object without receive beamforming, that is, without performing operation S307, when the condition is not satisfied.

Through the procedure shown in FIG. 3, the unmanned aerial vehicle may be detected and identified. Hereinafter, the detection operation and the identification operation of the unmanned aerial vehicle will be described in more detail.

Figure 4:
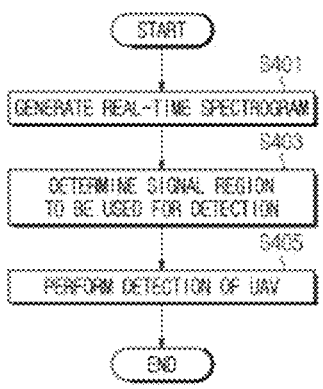
FIG. 4 illustrates an example procedure that detects an unmanned aerial vehicle, in accordance with one or more embodiments.

FIG. 4 illustrates an example of a procedure to detect an unmanned aerial vehicle, in accordance with one or more embodiments. FIG. 4 illustrates a method of operating an apparatus (e.g., the detection apparatus 110 of FIG. 1). The operations in FIG. 4 may be performed in the sequence and manner as shown. However, the order of some operations may be changed, or some of the operations may be omitted, without departing from the spirit and scope of the shown example. Additionally, operations illustrated in FIG. 4 may be performed in parallel or simultaneously. One or more blocks of FIG. 4, and combinations of the blocks, can be implemented by special purpose hardware-based computer that perform the specified functions, or combinations of special purpose hardware and instructions, e.g., computer or processor instructions. In addition to the description of FIG. 4 below, the descriptions of FIGS. 1-3 are also applicable to FIG. 4 and are incorporated herein by reference. Thus, the above description may not be repeated here for brevity purposes. The operations of FIG. 4 may be performed by a processor.

Referring to FIG. 4, in operation S401, the apparatus generates a real-time spectrogram. The apparatus may acquire received signals having predetermined bandwidth in a range including a band in which an unmanned aerial vehicle may be operated, and generate a real-time spectrogram of the received signals within a set frequency band. According to an embodiment, the spectrogram may be expressed in an image format. In this example, for subsequent signal analysis, after generating the real-time spectrogram, the apparatus may store information on the received signals in a storage space (e.g., a buffer memory) without discarding the information.

In operation S403, the apparatus determines a signal region to be used for detection. In an example, the signal region is specified by a signal band and a time interval. That is, a first axis of an image representing the spectrogram represents frequency and a second axis represents time, and the signal region occupies a certain frequency range and time interval. In this example, one or a plurality of signal regions may be determined. The apparatus may determine at least one signal region based on a pattern of pixel values expressed in the image. According to an embodiment, the apparatus may determine at least one signal region from an image representing a spectrogram by using a trained artificial intelligence model.

In operation S405, the apparatus performs detection of the unmanned aerial vehicle. In an example, the detection includes at least one of determining the presence or absence of the unmanned aerial vehicle, identifying a position of the unmanned aerial vehicle, or identifying a direction of the unmanned aerial vehicle. The apparatus may perform detection using signals received in a time interval and a frequency range specified by the determined at least one signal region. Accordingly, when generating the real-time spectrogram in operation S301, the apparatus may store information on the received signal (e.g., IQ data of the digitized received signal, the time-domain received signal value, etc.) in a storage space (e.g., buffer memory). Accordingly, the apparatus may read information on the received signals corresponding to the determined at least one signal region, analyze the received signals, and determine the direction of the unmanned aerial vehicle based on the result of analysis. In an example, the apparatus may perform detection based on at least one of an arrangement of at least one signal region, a size of the at least one signal region, a signal reception strength or a signal reception angle.

As described with reference to FIG. 4, the unmanned aerial vehicle may be detected based on a real-time spectrogram. Typically, a signal that is transmitted or received by the unmanned aerial vehicle may have characteristics such as a short duration and a changing frequency.

In order to perform direction finding based on a signal related to the unmanned aerial vehicle having characteristics such as a short duration and a changing frequency, the one or more examples may implement a real-time spectrogram. In order to detect a signal related to the unmanned aerial vehicle, the apparatus may generate a spectrogram using a seamless real-time spectrum. That is, in the drone detection and direction-finding system according to one or more examples, a synchronized multi-channel receiver may generate a real-time spectrogram and simultaneously generate FFT data for direction finding of the multi-channel receiver. This is to synchronize the data to select a direction-finding band and direction-finding data, since the signal is not continuously maintained in the same band.

As described with reference to FIG. 4, at least one signal region may be selected based on an image representing a real-time spectrogram, and an unmanned aerial vehicle may be detected using signals within the selected at least one signal region. Accordingly, since only some signals, not the signals included in the entire band and all time intervals of the received signal, may be used, an unnecessary operation may be excluded.

Figure 5:
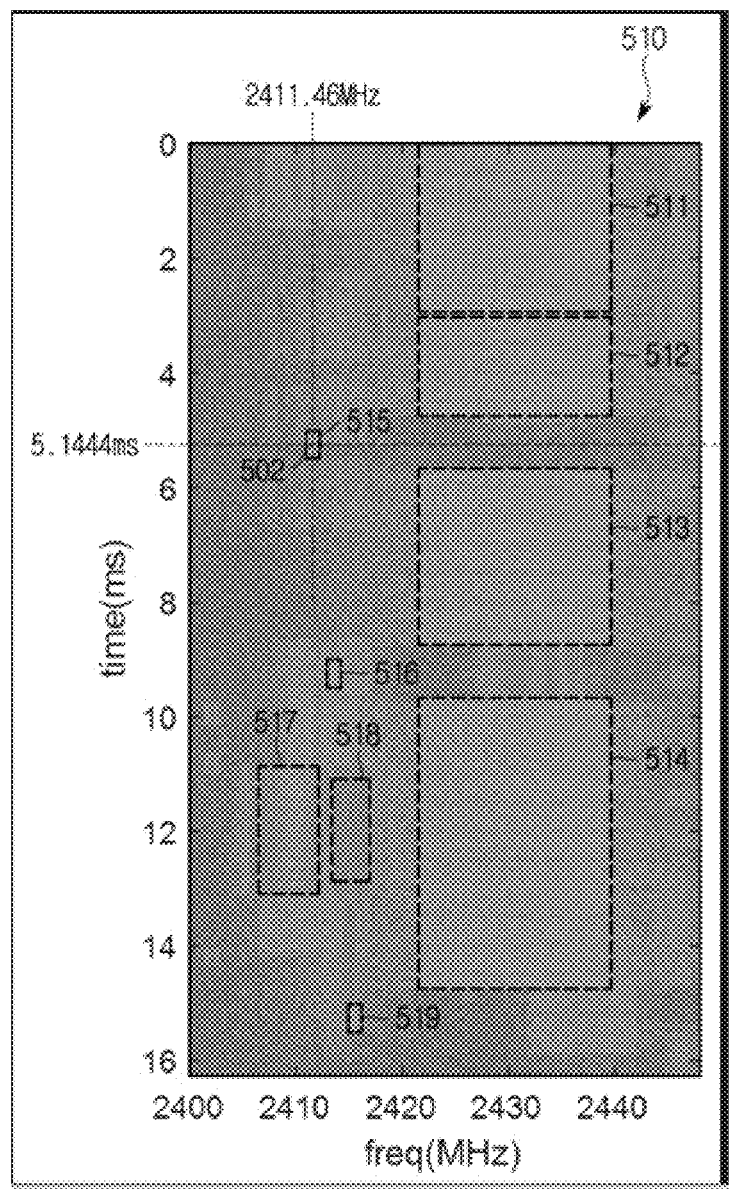
FIG. 5 illustrates an example of signal region selection that detects an unmanned aerial vehicle, in accordance with one or more embodiments.

An example of the at least one signal region selected based on the image is illustrated in FIG. 5 below. FIG. 5 illustrates an example of signal region selection to detect an unmanned aerial vehicle, in accordance with one or more embodiments. FIG. 5 illustrates a real-time spectrogram 510 of a signal collected in a Wi-Fi band of 2.4 GHz, wherein the horizontal axis indicates frequency, and the vertical axis indicates time.

Referring to FIG. 5, the spectrogram 510 represents a signal magnitude at each point specified by a combination of frequency and time as a color value or a shade value. Accordingly, a region in which a signal is expected to be present may be detected based on pixel values of the image representing the spectrogram 510. In the example of FIG. 5, nine signal regions 511 to 519 having different sizes were detected. In this example, preprocessing may be performed on the image in order to increase detection accuracy of the signal regions.

General detection of an unmanned aerial vehicle may be performed when a signal with a magnitude greater than or equal to a set threshold level is generated. However, since a detection algorithm may need a large amount of computation, it may be a great burden to process all consecutive signals. Accordingly, in the example of continuously existing signals, a method of processing sampled data may be adopted. However, when the unmanned aerial vehicle uses frequency hopping and OFDM, the detection time may have to be very short. Accordingly, the one or more examples extract a signal band for a signal with a short duration, may not perform an operation for detection on all data within the extracted band, and may perform detection only on a representative signal region or channel within the band, thereby responding quickly to signals related to the unmanned aerial vehicle. Accordingly, direction finding accuracy for the unmanned aerial vehicle may be improved, and direction finding may be performed quickly.

Figure 6:
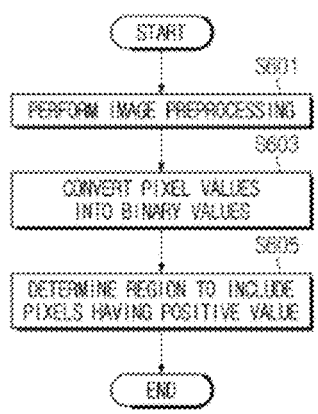
FIG. 6 illustrates an example procedure that determines a signal region based on a spectrogram image, in accordance with one or more embodiments.

FIG. 6 illustrates an example procedure to determine a signal region based on a spectrogram image, in accordance with one or more embodiments. FIG. 6 illustrates an operation method of the apparatus (e.g., the detection apparatus 110 of FIG. 1). The operations in FIG. 6 may be performed in the sequence and manner as shown. However, the order of some operations may be changed, or some of the operations may be omitted, without departing from the spirit and scope of the shown example. Additionally, operations illustrated in FIG. 6 may be performed in parallel or simultaneously. One or more blocks of FIG. 6, and combinations of the blocks, can be implemented by special purpose hardware-based computer that perform the specified functions, or combinations of special purpose hardware and instructions, e.g., computer or processor instructions. In addition to the description of FIG. 6 below, the descriptions of FIGS. 1-5 are also applicable to FIG. 6 and are incorporated herein by reference. Thus, the above description may not be repeated here for brevity purposes. The operations of FIG. 6 may be performed by a processor.

Referring to FIG. 6, in operation S601, the apparatus performs image preprocessing. The apparatus performs image-level correction on the spectrogram image. In an example, the spectrogram image is an image expressing a power value for each frequency of a received signal by a pixel value. For example, preprocessing may include at least one of noise reduction operation (e.g., filtering, moving average, blurring, etc.) or boundary value suppression operation (e.g., changing values less than a threshold to minimum values, adjusting values close to a threshold upward or downward, etc.). That is, in order to more effectively select a signal region in the real-time spectrogram, at least one image processing algorithm of filter processing for noise reduction, processing of setting a very-low-level lower limit that occurs in FFT processing, processing of setting an upper limit with respect to a value greater than the lower limit by a certain level, or processing of a specific number or less of consecutive pixels may be applied. That is, the apparatus generates a secondary image from the spectrogram image through preprocessing. In an example, setting the lower limit means changing all pixel values lower than the lower limit to a lower threshold, and setting the upper limit means changing all pixel values higher than the upper limit to an upper threshold. Additionally, the setting of the lower limit may be understood as adjustment of the level to increase the accuracy of distinguishing the boundary between the signal and the noise, and the setting of the upper limit may be understood to improve weak drone signal detection performance by preventing detection performance of the weak drone signal far from the receiver from deteriorating due to a strong signal close to the receiver.

In operation S603, the apparatus converts pixel values into binary values. A predefined threshold or a threshold determined based on the image may be used for conversion into the binary values. That is, the apparatus compares the value of each of the pixels of the preprocessed spectrogram image with a threshold, and changes the value of the pixel to a positive value if it is greater than or equal to the threshold, and changes the value of the pixel to a negative value if it is less than the threshold. In other words, the apparatus generates a tertiary image by binarizing each of the pixel values of the secondary image.

In operation S605, the apparatus determines at least one region to include pixels having a positive value. According to an embodiment, one region may be determined to have a rectangular shape specified by a starting point, a horizontal length, and a vertical length. For example, the region may be determined to include all pixels in a pixel cluster including pixels having a threshold number or more of adjacent positive values. In this example, at least one pixel having a negative value may be included in the region. As another example, the region may be determined such that a pixel having a negative value is not included. In this example, at least one pixel having a positive value in the cluster may be excluded from the region. As another example, the region may be determined such that a ratio of pixels having a negative value to pixels having a positive value is minimized.

In the procedure described with reference to FIG. 6, an operation of converting pixel values into binary values is performed, and for this purpose, determination of a threshold may be necessary. The threshold may be determined according to various criteria, and the one or more examples are not limited to a specific threshold determination criterion. In an example, the threshold may be determined based on a histogram of a spectrogram image. For example, when pixels are classified into two classes based on the threshold in the histogram, the apparatus may set the threshold to maximize the variance between the classes. That is, the apparatus may set, as the threshold, a value that makes the brightness distribution of the two classes most uniform.

As described with reference to FIG. 6, preprocessing may be performed on the spectrogram. Here, the preprocessing may be performed on the premise that the spectrogram is understood as at least one image. The spectrogram image may be obtained by converting a time-domain received signal into a frequency-domain signal, determining a power value for each frequency bin, and generating an image in which the power value is expressed using a pixel value. In an example, the frequency bin means a frequency range occupied by one pixel in the spectrogram image. According to an embodiment, the spectrogram image may be generated in real time together with radio wave measurement.

Figure 7A:
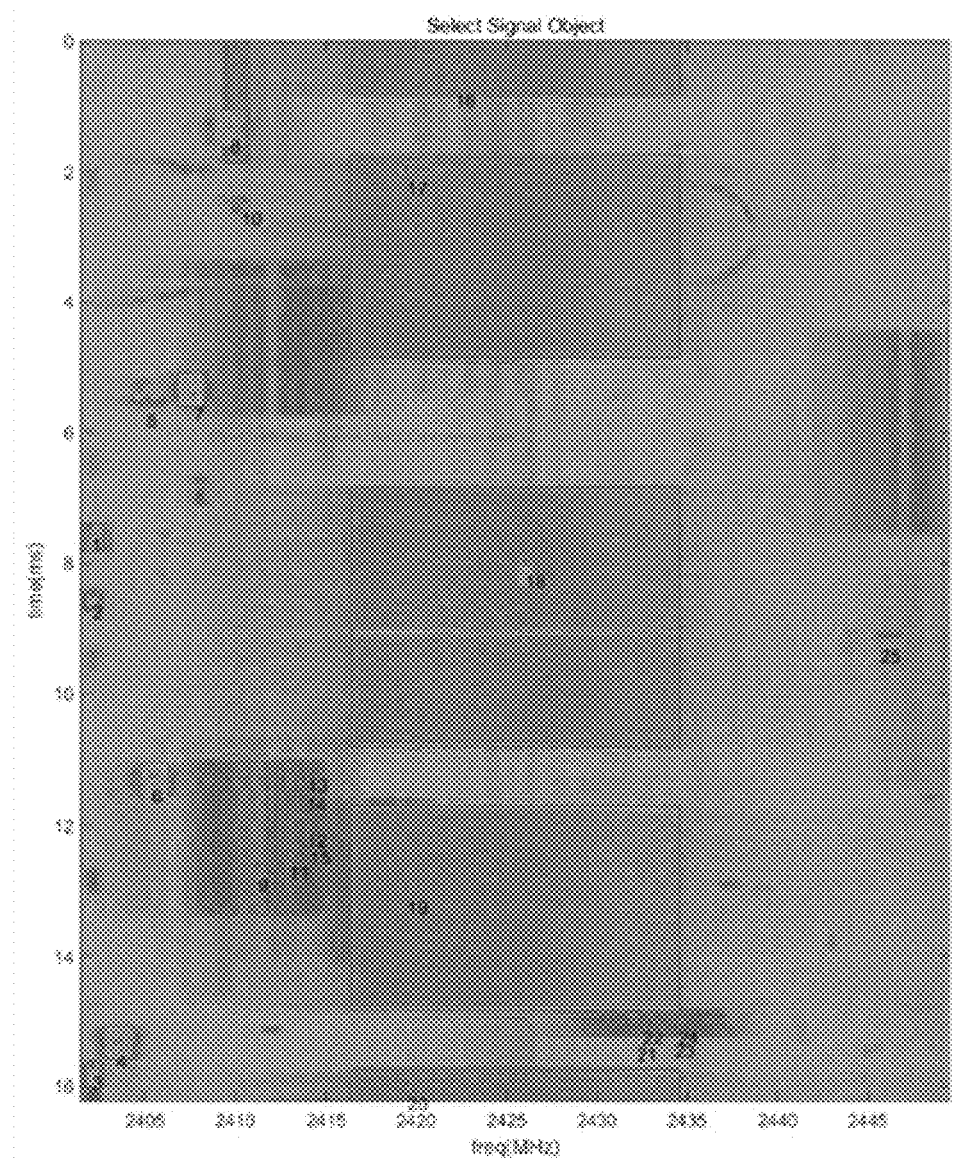
FIG. 7A and FIG. 7B illustrate examples of signal regions selected from a spectrogram image, in accordance with one or more embodiments.
Figure 7B:
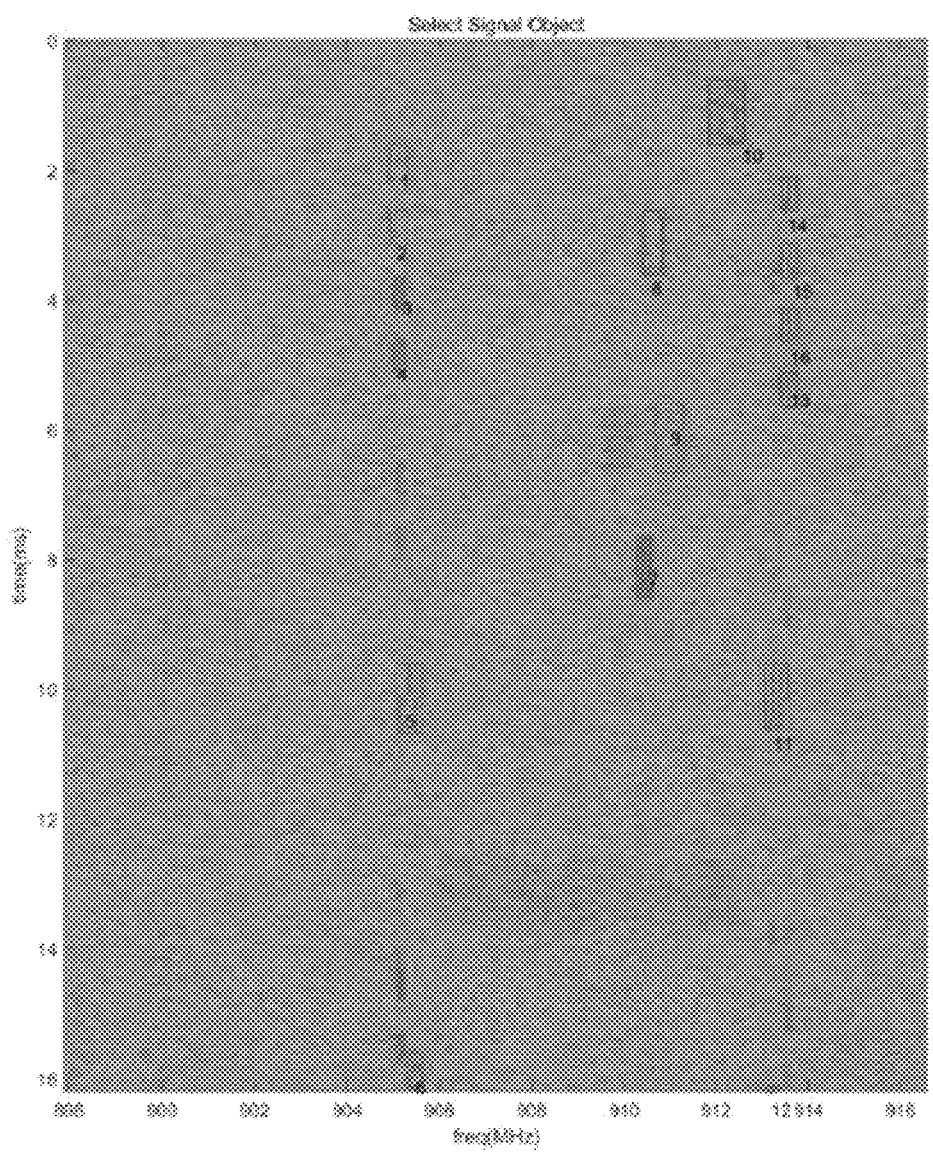

FIGS. 7A and 7B illustrate examples of signal regions selected from a spectrogram image, in accordance with one or more embodiments. FIGS. 7A and 7 illustrate results of selecting a signal band after preprocessing for a spectrogram image and indicating a region to be used for direction finding even within the band. In each of FIGS. 7A and 7B, 25 signal regions and 16 signal regions were selected. The existing wideband direction-finding technology is performed for each frequency (channel) if it is greater than or equal to a threshold level for all frequency channels within the bandwidth at a specific time. On the other hand, as illustrated in FIGS. 7A and 7B, the boundary is divided by extracting a signal band in which the signal related to the unmanned aerial vehicle is expected to be present, and, when direction finding is performed within a specific frequency (e.g., channel) belonging to the divided region, the amount of computation for direction finding is greatly reduced, and, as a result, a time for performing direction finding may be reduced. Furthermore, the time for performing direction finding may be minimized by summing the frequencies (e.g., channels) near a maximum level or at a maximum level among the regions and performing channel direction finding.

FIGS. 7A and 7B illustrate spectrograms in a Wi-Fi band. Therefore, in the spectrogram, a region including an unmanned aerial vehicle signal and a region including a Wi-Fi signal are mixed. In this example, when direction finding is performed, the unmanned aerial vehicle and a Wi-Fi apparatus will be estimated at different incidence angles, so that the unmanned aerial vehicle may be distinguished by grouping a plurality of direction-finding results.

As described above, in accordance with one or more embodiments, after image preprocessing representing a spectrogram, a signal region to perform a detection operation may be selected, and a direction of the unmanned aerial vehicle may be found using the selected signal region. In an example, after the spectrogram is divided into grid blocks, the direction of the unmanned aerial vehicle may be found using the grid blocks. An example implementing a grid block is as follows.

The method of determining that a signal is detected when the signal has a level greater than or equal to a specific set threshold level, and performing direction finding, is effective in a situation where a signal is continuously present in a band. However, when the unmanned aerial vehicle uses frequency hopping technology and orthogonal frequency division multiplexing (OFDM) waveform, the duration of the signal is short and the frequency is changed. In this example, it is desirable to quickly respond to the drone signal by performing direction finding only for the signal region within the band using the grid block.

Accordingly, in an example, a detection apparatus may continuously receive a signal of several tens of ms, generate a real-time spectrogram, and then divide the real-time spectrogram into grids to detect a signal region in order to perform direction finding. In other words, the detection apparatus generates a real-time spectrogram of the received drone signal, then divides the spectrogram into grid blocks having a size optimized for detecting the signal, and performs direction finding using only grid blocks determined as signals.

In the example of a direction-finding operation using grid blocks (hereinafter 'grid direction finding'), a statistical representative value is extracted for each grid block, and presence/absence of an unmanned aerial vehicle and a phase difference used in the direction-finding algorithm are calculated using the extracted representative value. Accordingly, disadvantages of a method of performing direction finding for each frequency bin or narrowband direction finding using an IQ signal may be supplemented. Since a representative value is statistically extracted using all the frequency bins included in the grid and samples for a certain time, grid direction finding is relatively robust to noise and has high reliability in distinguishing between signals and noise. Additionally, compared to the narrowband direction-finding using IQ samples, a channel direction finding method using the IQ signal has excellent performance, but has a limit to maintain excellent performance only when a signal is continuously generated on frequency and time axes and in the example of a relatively narrow band. In contrast, since grid direction finding uses only the samples included in the grid blocks regardless of whether it is continuous on the frequency axis and the time axis while using the statistical characteristics of many samples divided for each grid block, only the part corresponding to the signal may be extracted, and furthermore, it is robust to noise and may provide high reliability.

A representative value for each grid block may be extracted based on a level value of a sample in the grid block, and the like. The detection apparatus divides the real-time spectrogram into grid blocks, determines whether a signal is present for each grid block, determines a phase difference of received signals between antennas for each grid block including the signal, and then performs direction finding. That is, direction finding is performed using only grid blocks having representative values satisfying a certain criterion, and accordingly, direction finding may be effectively performed for a region corresponding to a signal.

The size of the grid block is preferably optimized according to the bandwidth of the signal and the duration of the signal. When the grid block is set to be small on the frequency axis and the time axis, it is advantageous in terms of resolution, but the number of grid blocks increases accordingly, and thus the amount of computation may increase. Therefore, the size of the grid block is determined based on the bandwidth of the signal to be detected and the duration of the signal, so that the size of the grid block may be flexibly designed to be configured differently for each signal. In this way, if direction finding is performed using only a part corresponding to the signal, it is possible to reduce the time for performing direction finding by greatly reducing the number of executions of the direction-finding algorithm.

Figure 8:
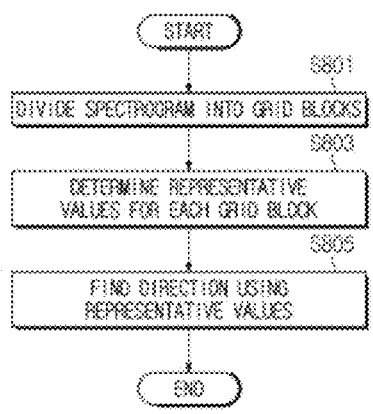
FIG. 8 illustrates an example procedure to find a direction of an unmanned aerial vehicle, in accordance with one or more embodiments.

FIG. 8 illustrates an example procedure to find a direction of an unmanned aerial vehicle, in accordance with one or more embodiments. FIG. 8 illustrates an operation method of an apparatus (e.g., the detection apparatus 110 of FIG. 1). The operations in FIG. 8 may be performed in the sequence and manner as shown. However, the order of some operations may be changed, or some of the operations may be omitted, without departing from the spirit and scope of the shown example. Additionally, operations illustrated in FIG. 8 may be performed in parallel or simultaneously. One or more blocks of FIG. 8, and combinations of the blocks, can be implemented by special purpose hardware-based computer that perform the specified functions, or combinations of special purpose hardware and instructions, e.g., computer or processor instructions. In addition to the description of FIG. 8 below, the descriptions of FIGS. 1-7B are also applicable to FIG. 8 and are incorporated herein by reference. Thus, the above description may not be repeated here for brevity purposes. The operations of FIG. 8 may be performed by a processor.

Figure 9:
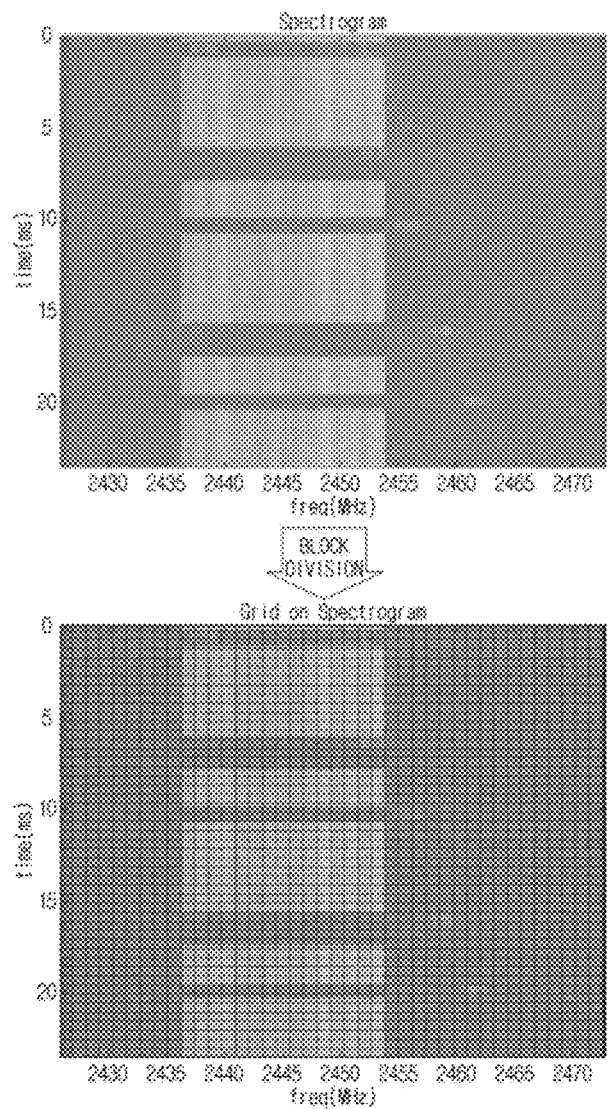
FIG. 9 illustrates an example of grid blocks generated in accordance with one or more embodiments.

Referring to FIG. 8, in operation S801, the apparatus divides spectrograms into grid blocks. The grid block means a resource region having a specified frequency width and a specified time length. At least one of the frequency axis size or the time axis size of the grid block may be fixed or adaptively adjusted according to an environment. For example, when a signal source is an apparatus belonging to an LTE/5G system, the grid block may be set to the same size as an RB. When the signal source is an apparatus belonging to another system, the grid block may be set to the same size as a resource unit of the system. That is, according to an embodiment, the size of the grid block may be determined according to the standard of a system to which a signal source to be detected belongs. Specifically, the size of the grid block may be determined to include a minimum resource allocation unit of the system to which the signal source belongs. An example of division into grid blocks is shown in FIG. 9. As illustrated in FIG. 9, the entire spectrogram may be divided into grid blocks having a constant size.

In operation S803, the apparatus determines representative values for each grid block. In other words, the apparatus determines a representative value for each of the plurality of grid blocks. Since one grid block includes a plurality of measurement values, the apparatus determines one representative value for each grid block, for direction finding. Since a plurality of spectrograms corresponding to a plurality of reception channels is generated, representative values corresponding in number to the number of spectrograms may be determined for one grid. In an example, the representative value includes size information and phase information, and phase difference information may be determined from the phase information. In an example, the size information includes size values for each antenna, the phase information includes phase values for each antenna, and the phase difference information includes phase difference values between two antennas. That is, the apparatus obtains phase difference information and size information for each grid block of the spectrogram. For example, the representative value may be determined in various forms, such as an average value, a median value, a minimum value, and a maximum value of size and phase difference values extracted from signal values in the grid block.

In operation S805, the apparatus finds a direction using the representative values. In other words, the apparatus performs direction finding based on the representative values of the grid blocks. According to an embodiment, the apparatus may execute a direction-finding algorithm using size information and phase difference information of each of the grid blocks. In an example, the direction-finding algorithm may be one of a phase comparison method (e.g., an interferometer), a correlated phase comparison method (e.g., a correlative interferometer (CI)), a multiple signal classification (MUSIC) technique, or a technique derived from at least one of them. At this time, prior to performing the direction-finding algorithm, the apparatus determines whether a signal is occupied in each grid block based on the representative values of the grid blocks or internal signal values, and performs the direction-finding algorithm using only the grid blocks occupied by the signal. Through this, the apparatus may obtain direction finding results for each grid block, identify at least one signal source based on the statistical distribution of direction-finding results for each grid block, and determine the direction of at least one signal source.

In the embodiment described with reference to FIG. 8, the apparatus divides the spectrogram into grid blocks. In accordance with one or more embodiments, in order to configure an accurate grid, it may be necessary to perform accurate frequency and time synchronization for a frame. In an example, when trying to classify grid blocks according to the OFDMA grid, the apparatus may synchronize a global positioning system (GPS) or perform a cell synchronization process through LTE/5G cell search. In this example, the boundary of the grid blocks may be determined to be aligned with the grid of the OFDMA signal. However, the one or more examples are not limited to synchronization for the frame.

In the embodiment described with reference to FIG. 8, the apparatus first generates grid blocks and then performs a direction-finding algorithm using only grid blocks occupied by a signal. According to another embodiment, after first determining whether it is occupied by a signal, grid blocks may be generated. That is, the apparatus may determine a region occupied by the signal based on the signal values of each point of the spectrogram, and divide the determined region into grid blocks. In this example, some of the determined regions adjacent to the boundary may not be included in the grid blocks.

Figure 10:
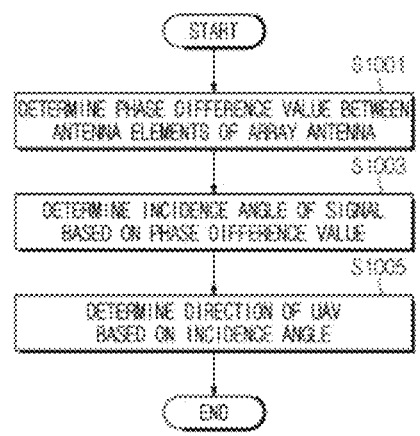
FIG. 10 illustrates an example procedure to find a direction of an unmanned aerial vehicle, in accordance with one or more embodiments.

FIG. 10 illustrates an example of a procedure for finding a direction of an unmanned aerial vehicle, in accordance with one or more embodiments. FIG. 10 illustrates an operation method of an apparatus (e.g., the detection apparatus 110 of FIG. 1). The operations in FIG. 10 may be performed in the sequence and manner as shown. However, the order of some operations may be changed, or some of the operations may be omitted, without departing from the spirit and scope of the shown example. Additionally, operations illustrated in FIG. 10 may be performed in parallel or simultaneously. One or more blocks of FIG. 10, and combinations of the blocks, can be implemented by special purpose hardware-based computer that perform the specified functions, or combinations of special purpose hardware and instructions, e.g., computer or processor instructions. In addition to the description of FIG. 10 below, the descriptions of FIGS. 1-9 are also applicable to FIG. 10 and are incorporated herein by reference. Thus, the above description may not be repeated here for brevity purposes. The operations of FIG. 10 may be performed by a processor.

Referring to FIG. 10, in operation S1001, the apparatus determines a phase difference value between antenna elements of an array antenna. The array antenna may be a one-dimensional array antenna or a two-dimensional array antenna.

In operation S1003, the apparatus determines an incidence angle of a signal based on the phase difference value. A difference may occur between a distance between one antenna element and a signal source and a distance between another antenna element and a signal source depending on the direction of the signal, and the difference between the distances causes a phase difference. Accordingly, the incidence angle may be calculated based on the phase difference between signals received by the antenna elements. Here, the incidence angle includes at least one of an azimuth or an elevation. In this example, the incidence angle may be determined based on the phase difference value by various well-known algorithms.

In operation S1005, the apparatus determines the direction of the unmanned aerial vehicle based on the incidence angle. The incidence angle indicates a relative direction with respect to antenna elements included in the antenna array. Accordingly, the apparatus may convert the incidence angle calculated based on the phase difference value into an absolute direction or a direction based on another criterion.

As described with reference to FIG. 10, the direction of the unmanned aerial vehicle may be determined. According to another embodiment, in addition to the direction, a distance from the unmanned aerial vehicle may be further estimated. For example, the apparatus may estimate the distance based on the signal strength of the unmanned aerial vehicle. As another example, the apparatus may estimate the distance based on a means (e.g., a sound level, an image, etc.) other than the signal. In this case, the apparatus may estimate how far the unmanned aerial vehicle is located based on sound collected in the determined direction, an image captured in the determined direction, and the like.

In an example, in addition to the direction, the position of the unmanned aerial vehicle may be further estimated. For example, the position may be estimated using two or more direction finding apparatuses. When the direction is estimated by each of the direction-finding apparatuses disposed at different positions, a point at which vectors representing the estimated directions intersect on a map may be estimated as the position of the unmanned aerial vehicle. That is, presence and direction/position of the unmanned aerial vehicle may be estimated based on the found directions using two or more apparatuses.

As described above, direction finding for a grid block may be performed. Since a plurality of grid blocks is included in one spectrogram, a plurality of directions may be found. In this example, the plurality of grid blocks may include signals transmitted from one unmanned aerial vehicle. Alternatively, some of the plurality of grid blocks may include signals transmitted from one unmanned aerial vehicle, and the remaining grid blocks may include signals transmitted from another unmanned aerial vehicle. Therefore, it may be necessary to group the grid blocks by object based on the direction-finding result. That is, it is necessary to integrate the direction-finding results for the same object among the direction-finding results performed for each grid block into one representative value.

The real-time spectrogram may include signals of a plurality of drones, or signals such as Wi-Fi and Bluetooth that share and use the same band may coexist. In order to distinguish signals from different signal sources, that is, to distinguish drone signals and other signals within the direction-finding result, a grouping process of the direction-finding result is required. Here, the direction-finding result grouped by object may be improved by using receive beamforming scheme that is used to improve the accuracy of signal identification. An example of a procedure for grouping direction finding results is shown in FIG. 11 below.

Figure 11:
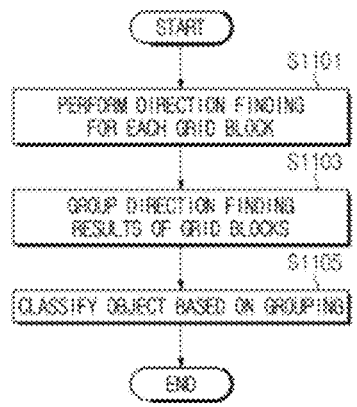
FIG. 11 illustrates an example procedure to group grid blocks, in accordance with one or more embodiments.

FIG. 11 illustrates an example of a procedure for grouping grid blocks, in accordance with one or more embodiments. FIG. 11 illustrates an operation method of an apparatus (e.g., the detection apparatus 110 of FIG. 1). The operations in FIG. 11 may be performed in the sequence and manner as shown. However, the order of some operations may be changed, or some of the operations may be omitted, without departing from the spirit and scope of the shown example. Additionally, operations illustrated in FIG. 11 may be performed in parallel or simultaneously. One or more blocks of FIG. 11, and combinations of the blocks, can be implemented by special purpose hardware-based computer that perform the specified functions, or combinations of special purpose hardware and instructions, e.g., computer or processor instructions. In addition to the description of FIG. 11 below, the descriptions of FIGS. 1-10 are also applicable to FIG. 11 and are incorporated herein by reference. Thus, the above description may not be repeated here for brevity purposes. The operations of FIG. 11 may be performed by a processor.

Referring to FIG. 11, in operation S1101, the apparatus performs direction finding for each grid block. The apparatus selects grid blocks, to which the direction-finding algorithm is to be applied, from the spectrogram, and then performs the direction-finding algorithm on each of the selected grid blocks. Accordingly, the apparatus may obtain direction finding results as many as the number of selected grid blocks.

In operation S1103, the apparatus groups the direction-finding results of the grid blocks. The apparatus may group direction finding results based on directions (e.g., angle values) indicated by direction finding results, and the positions of the grid blocks. Accordingly, at least one group for direction finding results is determined.

In operation S1105, the apparatus classifies at least one object based on grouping. That is, the apparatus may identify the number of object(s) detected in the spectrogram based on the grouping result. Additionally, the apparatus may determine a representative value of a direction for at least one group. For example, the detection apparatus may determine the most estimated azimuth as a representative value using a histogram distribution of a direction-finding result for each grid block belonging to the group.

As illustrated in FIG. 11, at least one object may be classified based on the direction-finding result. In this example, grouping may be performed based on the angle values indicated by the direction-finding result and the positions of the grid blocks.

In an example, the detection apparatus may determine direction finding results indicating similar directions as a group. Specifically, the detection apparatus may form at least one group such that a difference between angle values of all direction-finding results belonging to the same group is less than or equal to a threshold.

In an example, the detection apparatus may determine consecutive grid blocks as signals corresponding to one object, and determine the consecutive grid blocks as a group. This is because the drone signal generally spans several grid blocks and thus directions found in consecutive grid blocks may be treated as direction finding results of one object. In this example, in determining the continuity of the grid blocks, disconnection as many as the number of grid blocks less than a threshold may be treated as not impairing the continuity.

In an example, the detection apparatus may use both the angle value and the positions of the grid blocks. For example, even if the angle values of the two grid blocks are similar, when the two grid blocks are not included in a set of consecutive grid blocks, the detection apparatus may determine that the two grid blocks belong to different groups.

Figure 12:
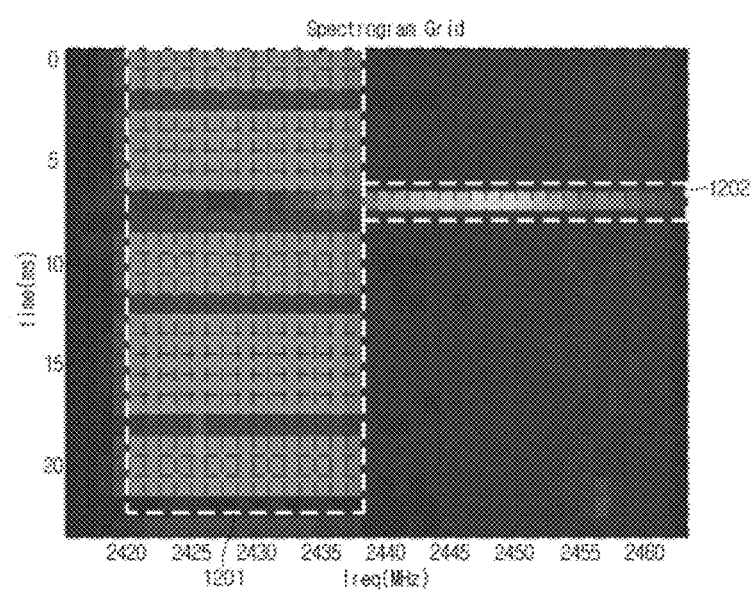
FIG. 12 illustrates an example result of grouping grid blocks, in accordance with one or more embodiments.

An example of the grouping result performed as described above is shown in FIG. 12 below. FIG. 12 illustrates an example result of grouping grid blocks, in accordance with one or more embodiments.

FIG. 12 illustrates a spectrogram in which a signal transmitted from one drone and a Wi-Fi signal are mixed. Referring to FIG. 12, when grouping is performed based on the direction indicated by the grid blocks, a first group 1201 including a drone image signal and a second group 1202 including a Wi-Fi signal may be classified. Alternatively, if grouping is performed based on the continuity of the grid blocks in a state where the disconnection of two or less grid blocks on the time axis is treated as having continuity, a first group 1201 including a drone image signal and a second group 1202 including a Wi-Fi signal may be classified. In this example, as a final direction-finding result, the Wi-Fi signal included in the second group 1202 may be excluded, and a representative value for the drone signal included in the first group 1201 may be provided.

As described above, grid direction finding may be performed. In this example, various preprocessing may be performed to improve the efficiency of direction finding and identification. Various embodiments of preprocessing will be described below.

In an example, preprocessing to detect an optimal region for feature extraction of a drone signal may be performed. An observed signal pattern may vary depending on the protocol used by the drone, such as frequency, bandwidth, and signal duration. Detecting a region that may express a signal pattern well may play a major role in detection and identification performance of drone signals. Additionally, since the real-time spectrogram used for artificial intelligence (AI)-based drone signal identification needs to be processed into input data having a certain format and size, it is preferable to use a signal region that may express the characteristics of the signal well in a given format and size. For example, a period in which a drone signal continues, stops, and starts again on the time axis is highly likely to include a signal for synchronization with a drone control apparatus, and a signal for synchronization often contains unique characteristics for each drone. Therefore, a preprocessing operation of extracting the signal region to include the start part of the drone signal may be used as one method.

Figure 13:
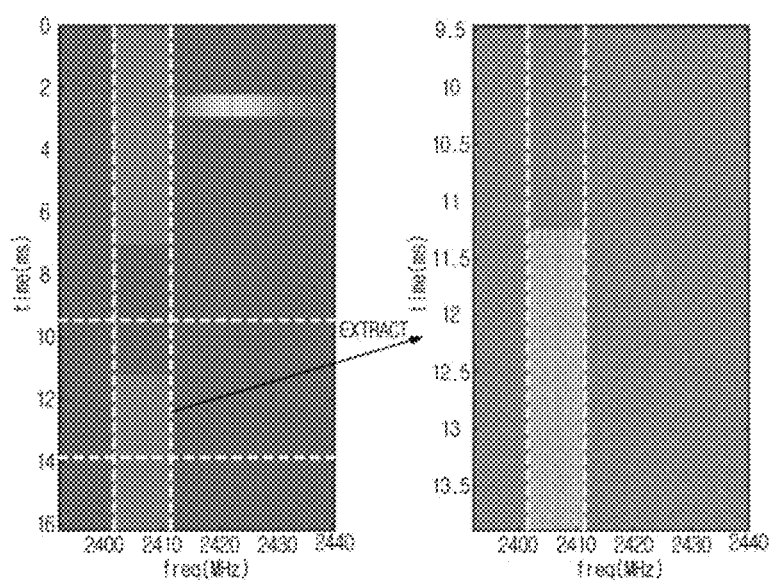
FIG. 13 illustrates an example signal region extracted to include a start part of a signal, in accordance with one or more embodiments.

Therefore, after receiving a signal for a time of several tens of ms, which is more than data used for direction finding and identification, and generating a real-time spectrogram, a signal region having a certain length including a period in which a signal is present and a period in which a signal is not present is used while including the start part of a drone signal in a spectrogram, thereby improving signal identification performance. An example of a signal region extracted to include a start part of a signal is shown in FIG. 13 below. In the following description, the signal region extracted to have a certain length while including the start part of the signal is referred to as a 'signal transition region'.

FIG. 13 illustrates an example of a signal region extracted to include a start part of a signal, in accordance with one or more embodiments.

FIG. 13 illustrates a signal transition region extracted to include the start part of a signal as much as the bandwidth of the signal on the frequency axis, in a signal received for several tens of ms. Accordingly, the detection apparatus estimates the bandwidth of the signal from the received signal, searches for a portion where the signal starts on the time axis, and then extracts a signal transition region including a signal including a period in which a signal is present and a period in which a signal is not present at a constant ratio. In this case, the time-axis length of the signal transition region may be predefined.

FIG. 13 illustrates an example in which the period in which the signal is present occupies about 60% to 80% of the extracted region and a length is 4.5 ms. However, the occupancy ratio and time length are examples, and the one or more examples are not limited thereto. As a result of performing an experiment while adjusting the period in which the signal is present and the period in which the signal is not present, it was confirmed that, when the signal transition region is extracted so that the period in which the signal is present within the detected region while including the start part of the signal is about 60% to 80%, performance is relatively better than the example where the signal is entirely included.

The signal transition region shown in FIG. 13 may be used for direction finding as well as for identification of the unmanned aerial vehicle. When the signal transition region is used, some of the grid blocks including the signal in the entire spectrogram may not be used for direction finding. However, when direction finding is performed using only the grid block in the signal transition region, the amount of computation to perform the direction-finding algorithm may be reduced. On the other hand, when grid blocks including the signal are used in the entire spectrogram, the amount of computation is relatively high, but reliability may be increased as the number of samples used is large.

Figure 14:
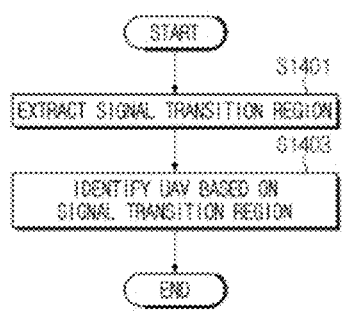
FIG. 14 illustrates an example procedure to identify a type of an unmanned aerial vehicle based on a signal transition region, in accordance with one or more embodiments.

FIG. 14 illustrates an example procedure to identify a type of an unmanned aerial vehicle based on a signal transition region, in accordance with one or more embodiments. FIG. 14 illustrates an operation method of an apparatus (e.g., the detection apparatus 110 of FIG. 1). The operations in FIG. 14 may be performed in the sequence and manner as shown. However, the order of some operations may be changed, or some of the operations may be omitted, without departing from the spirit and scope of the shown example. Additionally, operations illustrated in FIG. 14 may be performed in parallel or simultaneously. One or more blocks of FIG. 14, and combinations of the blocks, can be implemented by special purpose hardware-based computer that perform the specified functions, or combinations of special purpose hardware and instructions, e.g., computer or processor instructions. In addition to the description of FIG. 14 below, the descriptions of FIGS. 1-13 are also applicable to FIG. 14 and are incorporated herein by reference. Thus, the above description may not be repeated here for brevity purposes. The operations of FIG. 14 may be performed by a processor.

Referring to FIG. 14, in operation S1401, the apparatus extracts a signal transition region. Specifically, the apparatus identifies, from a spectrogram of a sufficiently long period (e.g., several tens of ms), a frequency band in which a signal is present, and identifies at least one portion of the spectrogram in which a signal starts within the identified frequency band. Then, the apparatus extracts a region having a predefined length within the identified frequency band so that the occupancy ratio of the period in which the signal is present is closest to a designated ratio. In this example, when a plurality of signal transition regions satisfying the specified ratio may be extracted, any one region may be selected according to a predefined criterion (e.g., selection of a fastest region, random selection, etc.) or all of the plurality of regions may be used.

In operation S1403, the apparatus identifies an unmanned aerial vehicle based on the signal transition region. In an example, the apparatus may identify the unmanned aerial vehicle based on an artificial intelligence model. That is, the apparatus converts signal values included in the signal transition region into input data for the artificial intelligence model, and performs prediction using the artificial intelligence model from the converted input data. Accordingly, the apparatus may acquire output data of the artificial intelligence model, and may identify the type of the unmanned aerial vehicle based on the output data.

As in the embodiment described with reference to FIG. 14, the unmanned aerial vehicle may be identified using an artificial intelligence model. For this, the artificial intelligence model may be trained in advance. The artificial intelligence model may be trained using labeled learning data. In this example, the learning data may include a signal transition region extracted from the spectrogram, like input data used for prediction, and may further include a label indicating the type of the unmanned aerial vehicle. That is, learning data to train the artificial intelligence model, in accordance with one or more embodiments, is generated through a procedure that extracts a signal transition region from a spectrogram, and the procedure may be defined similarly to step S1401 of FIG. 14.

Identification of the aforementioned unmanned aerial vehicle is based on the pattern of the signal. In this example, the possibility that different types of unmanned aerial vehicles have similar signal patterns may not be excluded. Accordingly, complementally, the characteristic information of the signal may be used. Each drone signal may have characteristics such as various frequency bands, bandwidths, and signal durations. By estimating the frequency, bandwidth, duration, etc. for each drone in advance and storing characteristic information such as the frequency, bandwidth, and signal duration used in the drone in a database, it is possible to improve signal identification accuracy using the characteristic information of the signal when identification is difficult due to similar signal patterns. An embodiment using characteristic information is shown in FIG. 15 below.

Figure 15:
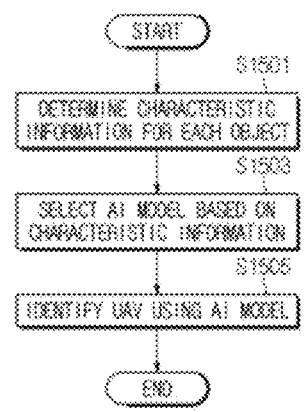
FIG. 15 illustrates an example procedure to identify a type of an unmanned aerial vehicle based on characteristic information, in accordance with one or more embodiments.

FIG. 15 illustrates an example procedure to identify a type of an unmanned aerial vehicle based on characteristic information, in accordance with one or more embodiments. FIG. 15 illustrates an operation method of an apparatus (e.g., the detection apparatus 110 of FIG. 1). The operations in FIG. 15 may be performed in the sequence and manner as shown. However, the order of some operations may be changed, or some of the operations may be omitted, without departing from the spirit and scope of the shown example. Additionally, operations illustrated in FIG. 15 may be performed in parallel or simultaneously. One or more blocks of FIG. 15, and combinations of the blocks, can be implemented by special purpose hardware-based computer that perform the specified functions, or combinations of special purpose hardware and instructions, e.g., computer or processor instructions. In addition to the description of FIG. 15 below, the descriptions of FIGS. 1-14 are also applicable to FIG. 15 and are incorporated herein by reference. Thus, the above description may not be repeated here for brevity purposes. The operations of FIG. 15 may be performed by a processor.

Referring to FIG. 15, in operation S1501, the apparatus determines characteristic information for each object. The characteristic information may be determined for each group determined by a grouping of the grid blocks. For example, the characteristic information may include at least one of frequency, bandwidth, signal duration or signal quality of a corresponding group.

In operation S1503, the apparatus selects an artificial intelligence model based on the characteristic information. That is, a plurality of artificial intelligence models may be defined, and one artificial intelligence model corresponding to the determined characteristic information may be selected.

In operation S1505, the apparatus identifies the unmanned aerial vehicle based on the artificial intelligence model. Specifically, the apparatus converts signal values included in the signal transition region into input data for an artificial intelligence model, and performs prediction using the artificial intelligence model from the converted input data. Accordingly, the apparatus may acquire output data of the artificial intelligence model, and may identify the type of the unmanned aerial vehicle based on the output data.

As described with reference to FIG. 15, one of a plurality of artificial intelligence models may be selected based on the characteristic information. According to another embodiment, a plurality of artificial intelligence models selectable according to the characteristic information may not be defined, and one general-purpose artificial intelligence model may be used. In this example, the general-purpose artificial intelligence model may further use the characteristic information as input data, in addition to the signal values of the signal transition region. That is, by using the characteristic information as input data, one artificial intelligence model may be manufactured by taking the characteristic information into account.

As described above, the unmanned aerial vehicle may be detected and identified using the spectrogram generated based on signal measurement. On the other hand, the detection distance of a drone in an anti-drone system is a very important performance index. Since improvement of the detection distance may maximize a time to prepare for an attack from the drone, minimizing the noise factor of the receiver and maximizing the gain of the antenna are very important implementations in the anti-drone system. Accordingly, in accordance with the one or more examples, the drone detection distance may be improved by implementing beamforming, and identification accuracy may be improved.

In one or more examples, a direction-finding system using a phase difference of an array antenna forms a beam of the antenna in a drone direction by adjusting the phase of each array antenna using the direction-finding result after performing direction finding. Accordingly, the signal quality (e.g., signal to noise ratio (SNR)) of the drone signal may be improved. When beamforming is applied, a drone signal at a relatively far distance may be detected, and the signal quality of the drone signal may be improved, thereby improving signal identification accuracy. An example of an identification procedure of an unmanned aerial vehicle to which beamforming is applied is shown in FIG. 16 below.

Figure 16:
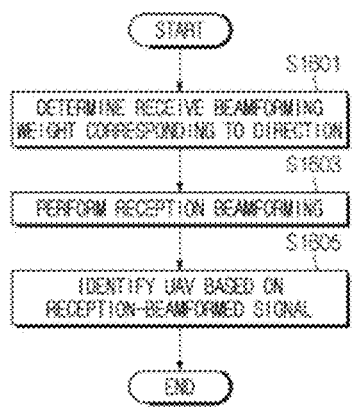
FIG. 16 illustrates an example procedure to identify a type of an unmanned aerial vehicle based on a receive-beamformed signal, in accordance with one or more embodiments.
Figure 17A:
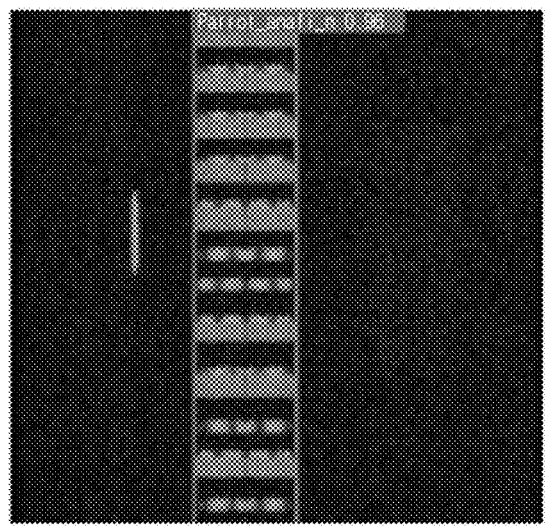
FIG. 17A, FIG. 17B, FIG. 17C, and FIG. 17D illustrate examples of results of identifying an unmanned aerial vehicle, in accordance with one or more embodiments.
Figure 17B:
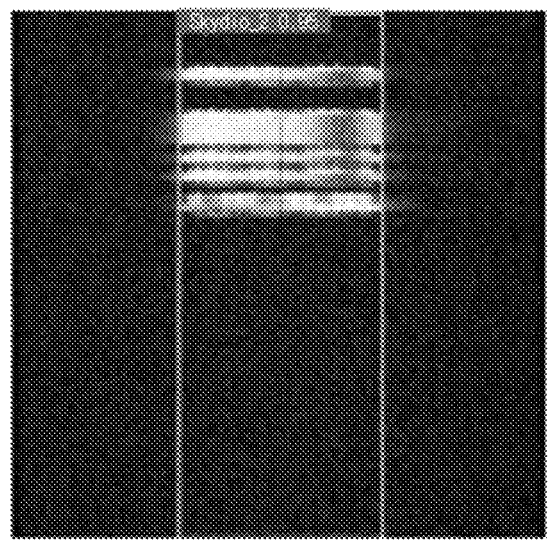
Figure 17C:
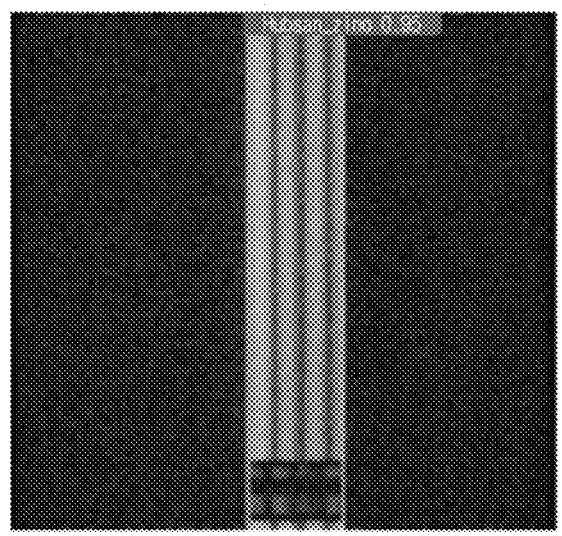
Figure 17D:
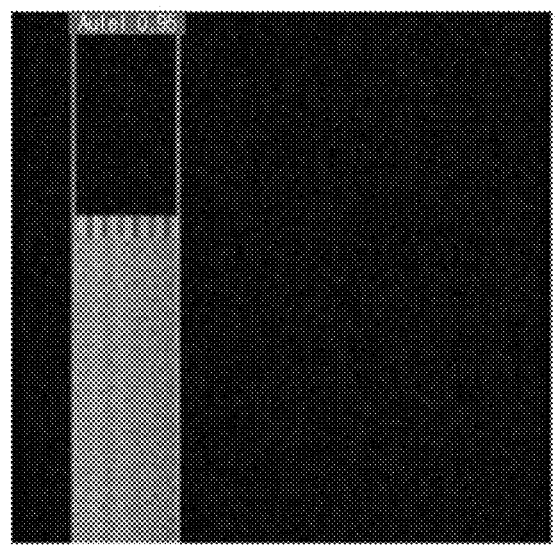

FIG. 16 illustrates an example procedure to identify a type of an unmanned aerial vehicle based on a receive-beamformed signal, in accordance with one or more embodiments. FIG. 16 illustrates an operation method of an apparatus (e.g., the detection apparatus 110 of FIG. 1). The operations in FIG. 16 may be performed in the sequence and manner as shown. However, the order of some operations may be changed, or some of the operations may be omitted, without departing from the spirit and scope of the shown example. Additionally, operations illustrated in FIG. 16 may be performed in parallel or simultaneously. One or more blocks of FIG. 16, and combinations of the blocks, can be implemented by special purpose hardware-based computer that perform the specified functions, or combinations of special purpose hardware and instructions, e.g., computer or processor instructions. In addition to the description of FIG. 16 below, the descriptions of FIGS. 1-15 are also applicable to FIG. 16 and are incorporated herein by reference. Thus, the above description may not be repeated here for brevity purposes. The operations of FIG. 16 may be performed by a processor.

In operation S1601, the apparatus determines a receive beamforming weight corresponding to a direction. The receive beamforming weight may be determined based on the direction-finding result. That is, the apparatus determines a receive beamforming weight that improves gain of a signal received from a direction indicated by a representative value of a direction-finding result of a corresponding object. For example, the apparatus may identify a receive beamforming weight vector corresponding to an angle value indicated by a representative value in a mapping table defining a reception beamformer for each angle value, that is, a receive beamforming weight vector.

In operation S1603, the apparatus performs receive beamforming. The apparatus may perform receive beamforming on a newly received signal. In an example, before extracting a signal transition region or generating a spectrogram, the apparatus may perform receive beamforming on signals received through a plurality of antennas. Accordingly, signal values measured for each antenna are combined into one value. Alternatively, the apparatus may perform receive beamforming on a signal previously used for direction finding.

In operation S1605, the apparatus identifies an unmanned aerial vehicle based on the receive-beamformed signal. Specifically, the apparatus generates a spectrogram using the receive-beamformed signal, extracts a signal transition region, converts signal values in the signal transition region into input data for an artificial intelligence model, and performs prediction using the artificial intelligence model from the converted input data. Accordingly, the apparatus may acquire output data of the artificial intelligence model, and may identify the type of the unmanned aerial vehicle based on the output data.

The identification procedure of the unmanned aerial vehicle including the receive beamforming described with reference to FIG. 16 may be performed when a set condition is satisfied. That is, if the condition is not satisfied, the identification procedure of the unmanned aerial vehicle may be performed without receive beamforming.

In an example, the condition may be related to whether performance for the identification of the unmanned aerial vehicle is secured without improving the gain of the signal through receive beamforming. In an example, the condition may be defined based on signal quality (e.g., signal to noise ratio (SNR)) of a signal from the unmanned aerial vehicle. Accordingly, the apparatus may use signal quality information included in the characteristic information determined for each group of grid blocks. Specifically, the apparatus may compare the signal quality of the corresponding unmanned aerial vehicle with the threshold, and perform receive beamforming when the signal quality is lower than the threshold.

Now, the presence and/or absence of a drone, the distinction between a drone and other objects, such as, but not limited to, a bird, and technologies that identify a drone, may mostly use images or photos of drones collected using electro-optical/infra-red (EO/IR). Alternatively, the existing technology that identifies a drone may be based on the characteristic information of the drone extracted using IQ data of the drone signal, or based on an analysis of the protocol of the signal. The one or more examples identify a drone based on a pattern of a real-time spectrogram having unique characteristics according to a protocol used by the drone.

FIGS. 17A to 17D illustrate the results of identifying real-time spectrograms for each drone signal showing various patterns according to a protocol of a signal used by the drone by implementing an artificial intelligence model.

FIGS. 17A to 17D illustrate examples of results of identifying an unmanned aerial vehicle, in accordance with one or more embodiments.

Referring to FIGS. 17A to 17D, a real-time spectrogram for each drone is included in learning data for each drone as an image, and the drone may be identified based on an image-based artificial intelligence technique. In an example, the artificial intelligence model that performs an identification may be implemented based on YOLOv5, which is deep learning technology widely used in image processing.

According to the above-described various embodiments, operations such as, but not limited to, signal detection, direction finding, and identification of the unmanned aerial vehicle may be performed. At this time, in performing the identification operation of the unmanned aerial vehicle, the signal detection operation or the direction-finding operation is not necessarily preceded. That is, in an example, the identification operation for the unmanned aerial vehicle may be performed without signal detection or direction finding. In this example, the apparatus may generate a spectrogram and perform an operation (e.g., the procedure of FIG. 14, the procedure of FIG. 15, or the procedure of FIG. 16) to identify the unmanned aerial vehicle using the generated spectrogram.

In this example, since grouping information of direction-finding results, direction information of the unmanned aerial vehicle, etc. may not be generated, the apparatus may omit the operation of generating characteristic information for each object or the receive beamforming operation. Accordingly, an apparatus that performs an identification operation without direction finding may be manufactured without hardware for receive beamforming (e.g., a plurality of antennas and a plurality of receivers). However, in an example, in consideration of a situation in which direction information determined by a third apparatus is input, the apparatus may be implemented to include hardware for receive beamforming. In this case, if direction information is provided from the third apparatus, the apparatus may perform a receive beamforming operation based on the provided information. Furthermore, depending on the implementation, the spectrogram may also be provided from the third apparatus.

The processors antenna device 210, signal receiver 220 communication device 230, real-time signal processor 240, processor 250, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-9, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method performed by an apparatus that detects unmanned aerial vehicles (UAVs), the method comprising:
   generating a spectrogram;
   determining a first region to find a direction of the UAVs in the spectrogram;
   finding a direction of a first UAV of the UAVs based on signal values in the determined first region;
   determining a second region to identify a type of the first UAV in the spectrogram; and
   identifying the type of the first UAV based on signal values in the determined second region,
   wherein the identifying the type of the first UAV comprises:
   determining a receive beamforming weight for signals from the first UAV based on the detected direction of the first UAV;
   performing receive beamforming on the signals from the first UAV included in the second region based on the receive beamforming weight; and
   determining the type of the first UAV based on the receive-beamformed signals.

2. The method of claim 1, wherein the receive beamforming is performed based on a determination that signal quality of the signals from the first UAV is lower than a threshold.

3. The method of claim 1, wherein the identifying the type of the first UAV further comprises:
   selecting an artificial intelligence model from among a plurality of artificial intelligence models based on characteristic information of the signals from the first UAV; and
   identifying the type of the first UAV based on signal values in the determined second region using the selected artificial intelligence mode,
   wherein the characteristic information comprises at least one of a frequency, a bandwidth, a signal duration, and a signal quality of the signals.

4. The method of claim 1, wherein the finding of the direction of the first UAV comprises:
   dividing the spectrogram into a plurality of grid blocks;
   receiving a plurality of direction-finding results by applying a direction-finding algorithm to each of the plurality of grid blocks; and
   grouping the plurality of direction-finding results into at least one group based on at least one of directions indicated by the direction-finding results and positions of the grid blocks,
   wherein the at least one group comprises at least one of a first group including signals from the first UAV and a second group including signals from a second UAV of the UAVs.

5. The method of claim 1, wherein the second region is determined such that the second region comprises a band of signals from the first UAV on a frequency axis, and
   a start part of signals from the first UAV on a time axis, and
   wherein the region is determined such that a ratio of a first period in which the signals are present to a second period in which the signals is not present is closest to a designated ratio.

6. The method of claim 1, wherein the type of the first UAV is identified by implementing an artificial intelligence model trained using learning data, and
   wherein the learning data comprises a region extracted from spectrogram and label indicating the type of UAV corresponding to the region,
   wherein the region is extracted, such that the region comprises a band of signals from a UAV on a frequency axis, the learning data comprises a start part of signals from the UAV on a time axis, and a ratio of a period in which the signals are present is closest to a designated ratio.

7. The method of claim 1, wherein the first region is selected based on respective representative values of a plurality of grid blocks divided from the spectrogram, or the first region is selected based on a pattern of values of pixels included in an image expressing the spectrogram.

8. A method performed by a first apparatus that detects an unmanned aerial vehicle (UAV), the method comprising:
   generating a spectrogram;
   determining a region to identify a type of the UAV from the spectrogram; and
   identifying the type of the UAV based on signal values in the determined region,
   wherein the region is determined such that the region comprises a band of signals from the UAV on a frequency axis and a start part of signals from the UAV on a time axis, and
   wherein the region is determined such that a ratio of a first period in which the signals are present to a second period in which the signal is not present is closest to a designated ratio.

9. The method of claim 8, wherein the spectrogram is generated from received signals.

10. A method of operating an apparatus that detects an unmanned aerial vehicle (UAV), the method comprising:
    generating an image indicating a real-time spectrogram;
    determining at least one region of the spectrogram based on a pattern of values of pixels included in the generated image; and
    finding a direction of the UAV based on received signals corresponding to the at least one region, and
    wherein the determining of the at least one region comprises:
    generating a secondary image by performing a preprocessing operation on the image;
    generating a tertiary image by binarizing each of pixel values of the secondary image; and determining the at least one region based on at least one cluster of pixels having a positive value among pixels having binarized values included in the tertiary image, wherein the preprocessing operation comprises a boundary value suppression operation of pixel values comprised in the image.

11. The method of claim 10, further comprising:

classifying the at least one region into a plurality of groups; and identifying a group corresponding to a signal related to the UAV based on at least one of a size and a frequency-axis position of at least one signal region of each of the plurality of groups.

12. The method of claim 10, wherein the finding of the direction of the UAV comprises:

reading information on received signals corresponding to the at least one region; and determining the direction of the UAV based on an analysis of the received signals.

13. The method of claim 10, wherein the preprocessing operation further comprises a noise reduction operation of the image.

14. The method of claim 10, wherein the boundary value suppression operation comprises an operation of changing values less than a threshold value among the pixel values to minimum values, or an operation of adjusting values adjacent to the threshold value upward or downward.

15. The method of claim 10, wherein the finding of the direction of the UAV comprises:

determining phase difference values between received signals in antenna elements of an array antenna;

determining an incidence angle of the received signals based on the phase difference values; and determining the direction based on the incidence angle.

16. The method of claim 10, further comprising estimating a distance from the UAV.

17. The method of claim 16, wherein the distance is estimated based on at least one of sound collected in the direction, and an image captured in the direction.

* * * * *